US006726170B2

(12) United States Patent

Luo

(10) Patent No.: US 6,726,170 B2

(45) Date of Patent: Apr. 27, 2004

(54) DUAL POSITION FLAG POLE BRACKET

(75) Inventor: Andrew Luo, Nanjing (CN)

(73) Assignee: Beijing Trade Exchange, Inc., Washington, DC (US)

( * ) Notice: Subject to any disclaimer, the term of this patent is extended or adjusted under 35 U.S.C. 154(b) by 0 days.

(21) Appl. No.: 10/360,592

(22) Filed: Feb. 7, 2003

(65) Prior Publication Data

US 2003/0168573 A1 Sep. 11, 2003

Related U.S. Application Data

(63) Continuation-in-part of application No. 29/164,783, filed on Jul. 30, 2002.

(60) Provisional application No. 60/355,567, filed on Feb. 7, 2002.

(51) Int. Cl.[7] ........................ E04H 12/22; A01K 97/10

(52) U.S. Cl. ........................................ 248/538; 248/520

(58) Field of Search ................................ 248/512, 535, 248/538, 539, 541, 520; 52/298; 224/922; D11/183, 182; D12/223; 211/60.1, 62, 63, 68, 69.5

(56) References Cited

U.S. PATENT DOCUMENTS

| | | | | | |
|---|---|---|---|---|---|
| 1,121,487 | A | * | 12/1914 | Fleagle | 248/513 |
| 1,198,840 | A | | 9/1916 | Hanck et al. | 248/534 |
| 1,203,937 | A | * | 11/1916 | Surface | 248/513 |
| 1,263,277 | A | * | 4/1918 | Paine et al. | 248/512 |
| 1,404,777 | A | * | 1/1922 | Leutner | 248/512 |
| 2,118,467 | A | | 5/1938 | Jones | 403/173 |
| 3,104,122 | A | | 9/1963 | Daniels | 403/190 |
| 4,593,877 | A | * | 6/1986 | van der Wyk | 248/512 |
| D340,676 | S | | 10/1993 | Gallagher | D11/182 |
| 5,269,488 | A | | 12/1993 | Lach | 248/535 |
| 5,472,166 | A | * | 12/1995 | Wear | 248/514 |
| 5,533,295 | A | * | 7/1996 | Hochberger | 43/21.2 |
| 5,588,630 | A | | 12/1996 | Chen-Chao | 248/514 |
| RE35,731 | E | | 2/1998 | Lach | 248/535 |
| 6,010,107 | A | * | 1/2000 | Goldfarb | 248/512 |
| 6,015,122 | A | | 1/2000 | Qui | 248/156 |
| D448,717 | S | | 10/2001 | Hanson et al. | D12/223 |

OTHER PUBLICATIONS

Eugenia's Country Flags LLC, web.archive.org/web/19990823212857/http://eugeniascountryflags.com/poles__holders/index.htm published Aug. 23, 1999.*

College Flags & Banners, web.archive.org/web/20011226065831/http://colegeflagsandbaners.com/item.html?PRID=686570, published Dec. 26, 2001.*

* cited by examiner

*Primary Examiner*—Leslie A. Braun
*Assistant Examiner*—Jon Szumny
(74) *Attorney, Agent, or Firm*—Foley & Hoag LLP

(57) ABSTRACT

Dual position flag pole brackets that permit a flag to be mounted in either of two different positions are described herein. In one embodiment, a dual position flag pole bracket may include a base, a first elongate portion for receiving a flag pole, and a second elongate portion for receiving a flag pole. The first elongate portion may be disposed adjacent the base at a first location, and the second elongate portion may be disposed adjacent the base at a different second location. The second elongate portion may intersect the first elongate portion at a region of intersection spaced apart from the base.

30 Claims, 4 Drawing Sheets

DUAL POSITION FLAG POLE BRACKET

REFERENCE TO RELATED APPLICATIONS

This application claims priority to U.S. Patent Application Serial No. 60/355,567, filed on Feb. 7, 2002, pending, Continuation-in-part of application Ser. No. 29/164,783, filed on Jul. 30, 2002, also pending. The contents of both of these applications are explicitly incorporated by reference herein.

BACKGROUND

A flag pole bracket is a device for mounting flags and other hanging objects, such as banners, planters, and windsocks.

A variety of flag pole brackets are currently available. Many flag pole brackets lack versatility in mounting flags and other hanging objects in more than one position, thus inhibiting their degree of utility.

SUMMARY

Dual position flag pole brackets that permit a flag to be mounted in either of two different positions are described herein.

In one embodiment, a dual position flag pole bracket may include a base, a first elongate portion for receiving a flag pole, and a second elongate portion for receiving a flag pole. The first elongate portion may be disposed adjacent the base at a first location, and the second elongate portion may be disposed adjacent the base at a different second location. The second elongate portion may intersect the first elongate portion at a region of intersection spaced apart from the base.

In one aspect, the base may include first and second receiving apertures, and the first and second locations may coincide with the first and second receiving apertures, respectively.

In one aspect, the base may include a substantially planar surface for attaching the base to a mounting surface.

In one aspect, the base may include at least one mounting aperture for receiving at least one mated fastener for attaching the base to a mounting surface.

In one aspect, the first and second elongate portions may be removeably and replaceably attachable to the base.

In one aspect, the base may include first and second receiving apertures disposed at the first and second locations, and the first and second elongate portions may be removeably and replaceably insertable into the first and second apertures, respectively.

In one aspect, the first and second elongate portions may include first and second longitudinal axes oriented at different first and second angles with respect to the base.

In one aspect, the first and second elongate portions may include first and second longitudinal axes, in which one of the axes may be oriented substantially perpendicular to the base, and the other of the axes may be oriented at an acute angle with respect to the base. In one aspect, the acute angle may span substantially 45 degrees.

In one aspect, the first and second elongate portions may include substantially oval transverse cross-sections.

In one aspect, one of the first and second elongate portions may include a substantially circular transverse cross-section, and the other of the first and second elongate portions may include a substantially elliptical transverse cross-section.

In one aspect, the first and second elongate portions may be attached to each other.

In one aspect, the dual position flag pole bracket may be constructed from at least one of ceramic, metal, nylon, plastic, and wood.

In one aspect, the dual position flag pole bracket may be integrally formed.

In one embodiment, the dual position flag pole bracket may further include at least one tightening aperture for receiving at least one mated fastener for inhibiting movement of a flag pole disposed in either of the first and second elongate portions, in which the at least one tightening aperture may be disposed adjacent the region of intersection.

In one aspect, the tightening aperture may include threads.

In one embodiment, the dual position flag pole bracket may further include at least one sidewall surrounding the at least one tightening aperture, in which the sidewall may extend laterally outward from the region of intersection.

These and other features of the dual position flag pole brackets described herein may be more fully understood by referring to the following detailed description and accompanying drawings.

DETAILED DESCRIPTION

Figure 1:
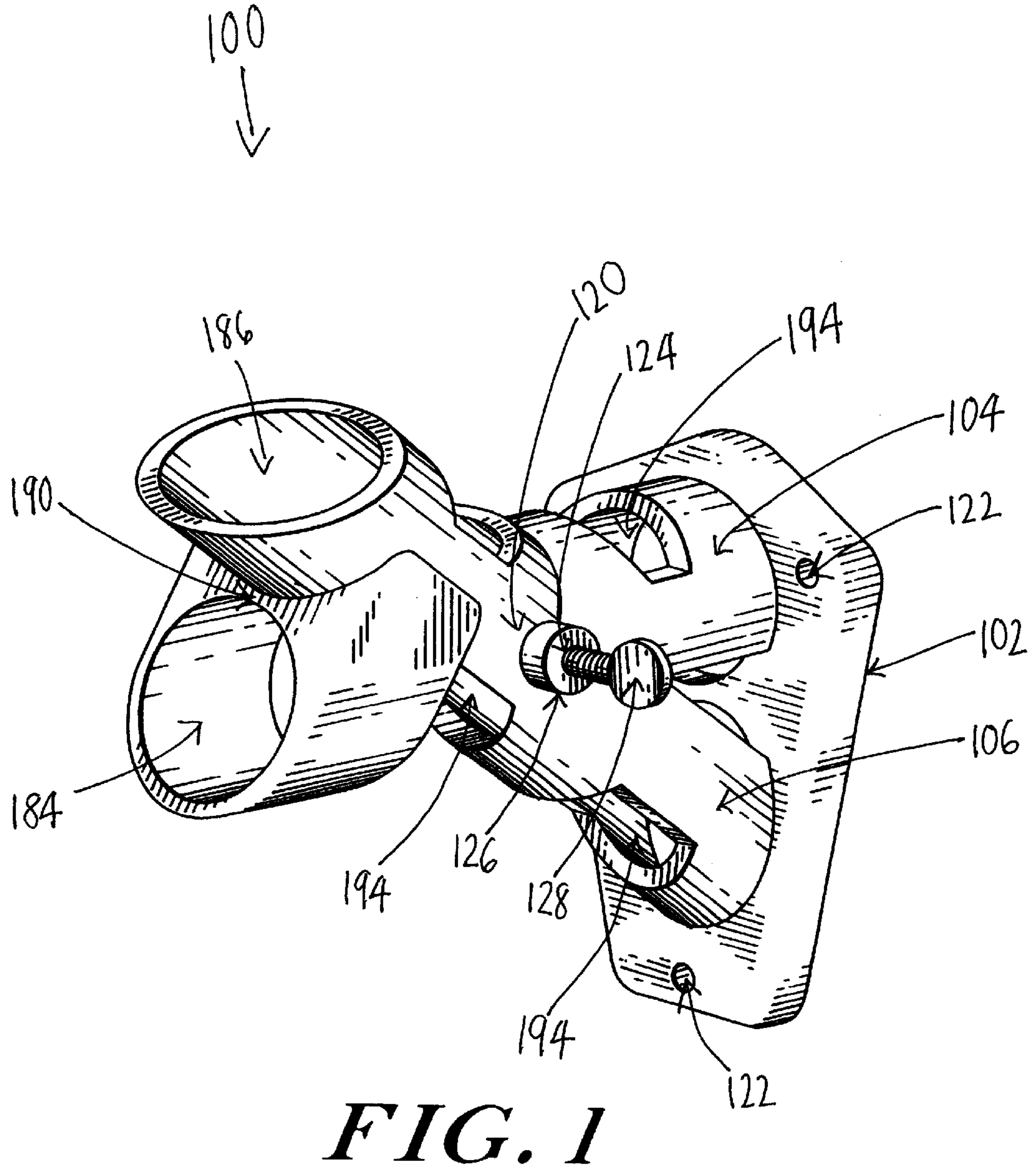
FIG. 1 is a perspective view of an embodiment of a dual position flag pole bracket.

Certain embodiments will now be described to provide an overall understanding of the dual position flag pole brackets described herein. One or more examples of the embodiments are shown in the drawings. Those of ordinary skill in the art will understand that the dual position flag pole brackets described herein can be adapted and modified to provide devices, methods, schemes, and systems for other applications, and that other additions and modifications can be made to the brackets described herein without departing from the scope of the present disclosure. For example, aspects, components, features, and/or modules of the embodiments can be combined, separated, interchanged, and/or rearranged to generate other embodiments. Such modifications and variations are intended to be included within the scope of the present disclosure.

Figure 2:
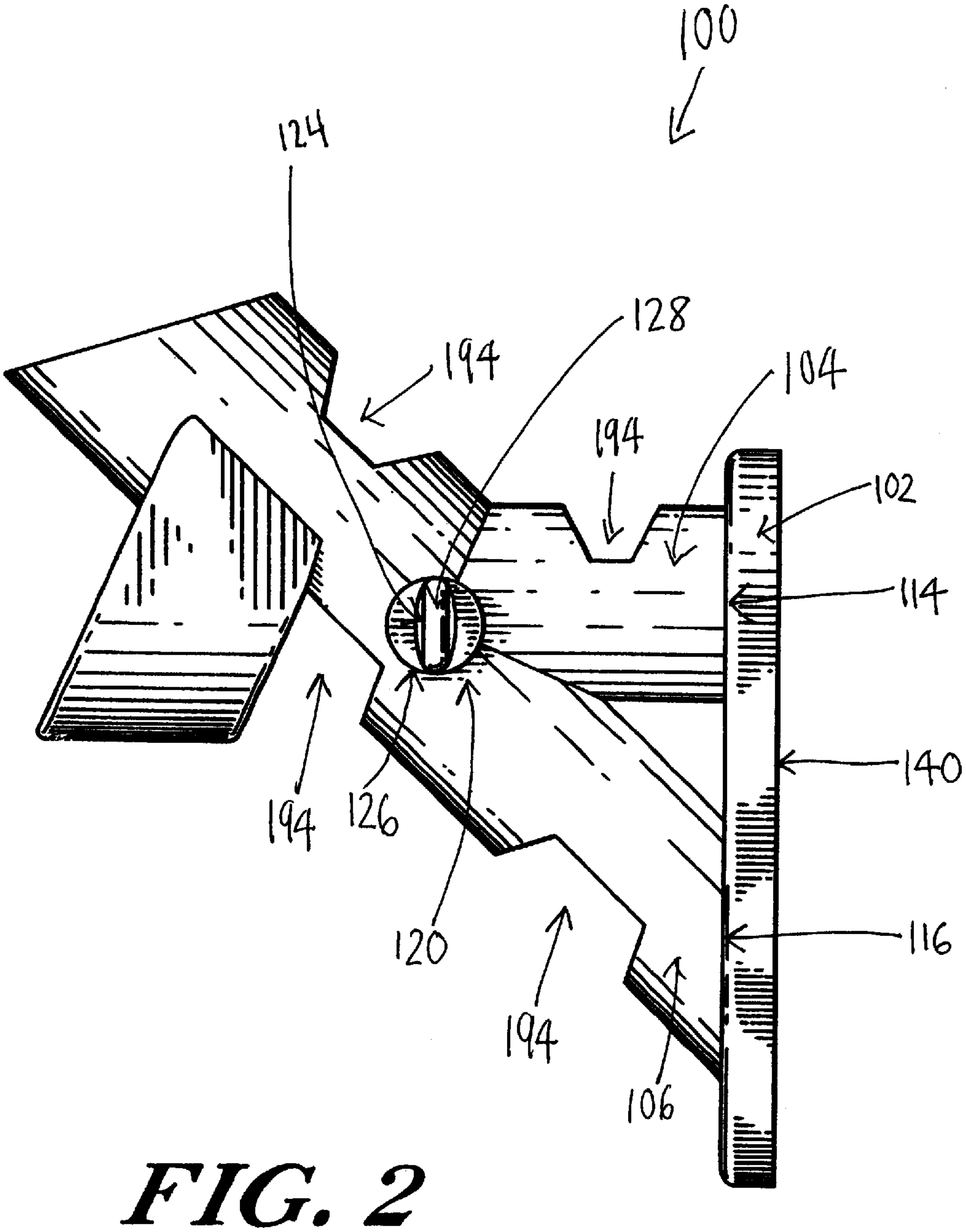
FIGS. 2 and 3 are side views of the dual position flag pole bracket shown in FIG. 1.
Figure 3:
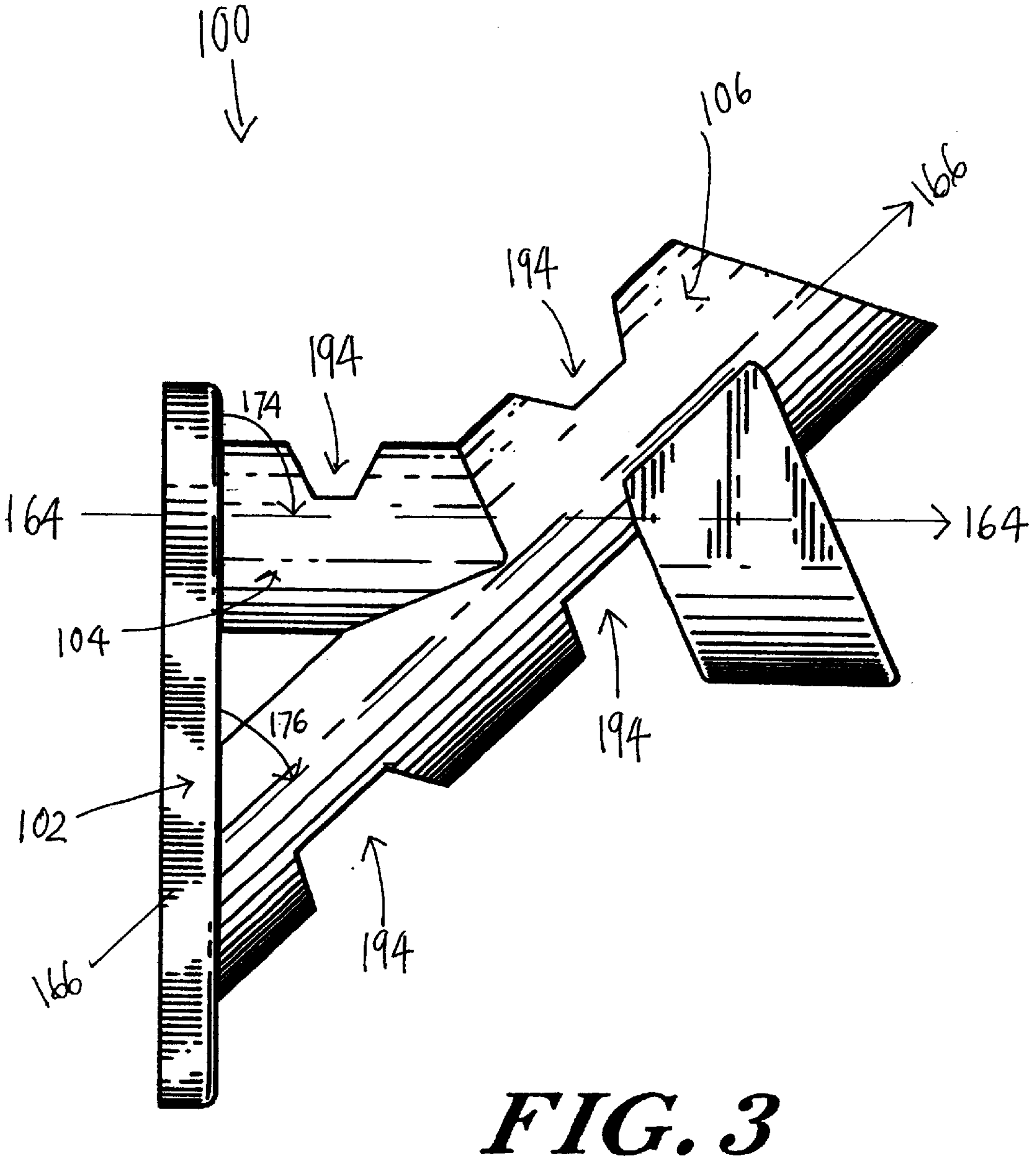

An embodiment of a dual position flag pole bracket is shown in FIGS. 1–3. As shown in the embodiment of FIG. 1, the dual position flag pole bracket 100 may include a base 102, a first elongate portion 104 for receiving a flag pole, and a second elongate portion 106 for receiving a flag pole. As shown in the embodiment of FIG. 2, the first elongate portion 104 may be disposed at a first location 114 on the base 102, and the second elongate portion 106 may be disposed at a different second location 116 on the base 102. As shown in the embodiment of FIGS. 1–3, the first and second elongate portions 104, 106 may intersect at a region of intersection 120 spaced apart from the base 102. As shown in the embodiment of FIGS. 1–3, a flag pole or other similar object may be mounted in either the first elongate portion 104 or the second elongate portion 106. As such, the dual position flag pole bracket 100 may permit a flag or other hanging object, such as a banner, a planter, and a windsock, to be mounted in either of two different positions.

Views of the base 102 of the dual position flag pole bracket 100 are shown in FIGS. 1–4. As shown in the embodiment of FIG. 2, the base 102 may include a substantially planar surface 140 for disposing the base 102 on, or attaching the base 102 to, a mounting surface. In one embodiment, the base 102 may be freely disposed on a substantially horizontal mounting surface without additional support. In one embodiment, the base 102 may be attached to a mounting surface by using an adhesive, a weld, and/or another conventional medium.

Figure 4:
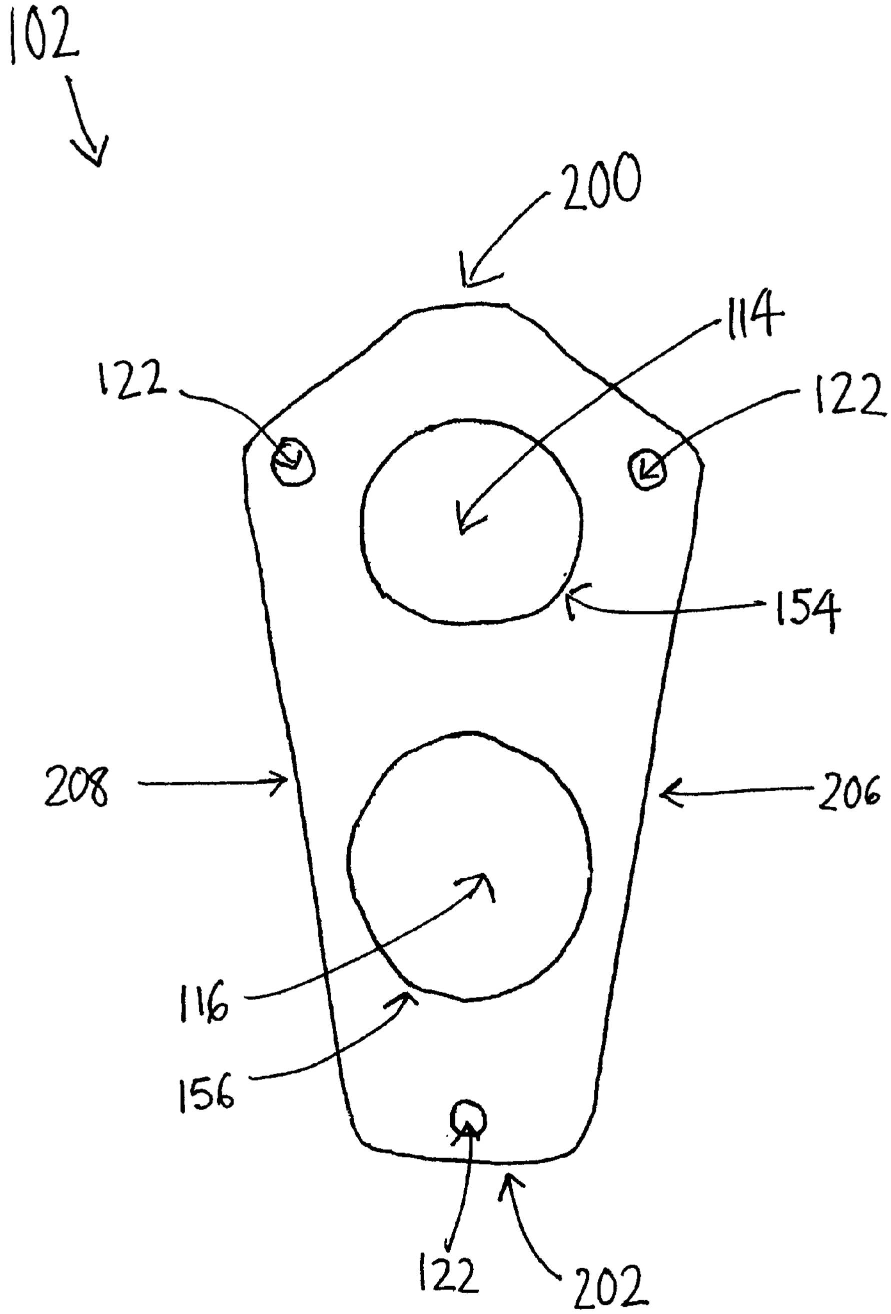
FIG. 4 is a top view of a base of the dual position flag pole bracket shown in FIG. 1.

As shown in the embodiment of FIGS. 1 and 4, the base 102 may include at least one mounting aperture 122 for receiving at least one mated fastener for attaching the base 102 to a mounting surface. The at least one mated fastener may include at least one removeable and a replaceable fastener. For example, the at least one mated fastener may include at least one of a dowel, a nail, a nut and a bolt, a screw, a spike, a tack, and/or another conventional fastener.

The base 102 may include a variety of shapes. For example, the base 102 may include a substantially oval shape, a substantially polygonal shape, a substantially semi-oval shape, or a shape that is a combination of the foregoing shapes. As shown in the embodiment of FIGS. 1 and 4, the base 102 may include a substantially hexagonal shape having a triangular front 200, a flat back 202, and slanted elongate sides 206, 208. As shown in the embodiment of FIG. 4, the base 102 may include three mounting apertures 122, in which two are disposed adjacent the front 200 and one is disposed adjacent the back 202.

Views of the first and second elongate portions 104, 106 of the dual position flag pole bracket 100 are shown in FIGS. 1–3. Generally, the first and second elongate portions 104, 106 may be sufficiently extended in length to support a flag pole or other similar object disposed therein. Generally, the first and second elongate portions 104, 106 may include substantially cylindrical or substantially tubular shapes. In one embodiment, at least one of the first and second elongate portions 104, 106 may include cut-outs to reduce weight and/or cost of manufacture of the dual position flag pole bracket 100. For example, as shown in the embodiments of FIGS. 1–3, the first and second elongate portions 104, 106 may include cutouts 194.

The first and second elongate portions 104, 106 may include a variety of transverse cross-sections. For example, the first and second elongate portions 104, 106 may include transverse cross-sections having substantially oval shapes, substantially polygonal shapes, substantially semi-oval shapes, or shapes that are a combination of the foregoing. The shapes of the transverse cross-sections may be mated to the shapes of flag poles or other similar objects that may be disposed in the first and second elongate portions 104, 106.

Generally, the first and second elongate portions 104, 106 may include different transverse cross-sections. As shown in the embodiment of FIG. 1, the first elongate portion 104 may include a substantially circular transverse cross-section 184, and the second elongate portion 106 may include a substantially elliptical transverse cross-section 186.

As shown in the embodiment of FIG. 3, the first and second elongate portions 104, 106 may include first and second longitudinal axes 164—164, 166—166 oriented at first and second angles 174, 176, respectively, with respect to the base 102. Generally, the first and second elongate portions 104, 106 may be oriented at similar or different angles 174, 176. As shown in the embodiment of FIG. 3, the first angle 174 may span substantially 90°, and the second angle 176 may span an acute angle, such as substantially 45°. For purposes of clarity, angles 174, 176 are measured by clockwise rotation with respect to the base 102.

As shown in the embodiment of FIG. 2, the first and second elongate portions 104, 106 may be disposed on the base 102 at first and second locations 114, 116. Generally, the first and second elongate portions 104, 106 may be disposed on the base 102 so that they are substantially centered about the first and second locations 114, 116, respectively.

The first and second elongate portions 104, 106 may be attached to the base 102. For example, the first and second elongate portions 104, 106 may be attached to the base 102 by using an adhesive, a weld, and/or another conventional medium.

The first and second elongate portions 104, 106 may be attached to each other for support. For example, the first and second elongate portions 104, 106 may be attached at location 190 or another location by using an adhesive, a weld, and/or another conventional medium.

In one embodiment, the first and second elongate portions 104, 106 and the base 102 may include a unitary construction. For example, in one embodiment, the first and second elongate portions 104, 106 and the base 102 may be formed from a molded piece of plastic.

As shown in the embodiment of FIG. 4, the base 102 may include first and second receiving apertures 154, 156 disposed at the first and second locations 114, 116, respectively. Generally, the first and second receiving apertures 154, 156 may be substantially centered about the first and second locations 114, 116, so that they coincide with the first and second locations 114, 116, respectively.

The first and second receiving apertures 154, 156 may be sized and shaped to receive the first and second elongate portions 104, 106, respectively. In one embodiment, the first and second elongate portions 104, 106 may be removeably and replaceably insertable into the first and second receiving apertures 154, 156, respectively. In one embodiment, the first and second elongate portions 104, 106 may be attached to the base at the location of the first and second receiving apertures 154, 156, respectively, by an adhesive, a weld, or another conventional medium.

As shown in the embodiment of FIGS. 1 and 2, the dual position flag pole bracket 100 may include at least one tightening aperture 124 for receiving at least one mated fastener for inhibiting movement of a flag pole or a similar object disposed in either of the first and second elongate portions 104, 106. The tightening aperture 124 may be disposed adjacent the region of intersection 120. The tightening aperture 124 may be designed to receive a removeable and replaceable fastener that may include at least one of a dowel, a nail, a nut and a bolt, a screw, a spike, a tack, and/or another conventional fastener. As shown in the embodiment of FIGS. 1 and 2, the tightening aperture 124 may include threads, and the mated fastener may include a set screw 128.

As shown in the embodiment of FIGS. 1 and 2, the dual position flag pole bracket 100 may include at least one sidewall 126 substantially surrounding the at least one tightening aperture 124. The sidewall 126 may extend laterally outward from the region of intersection 120 and may be designed to facilitate a fit between the tightening aperture 124 and a mated fastener. The sidewall 126 may include a variety of different shapes.

Generally, the dual position flag pole bracket 100 may be constructed from a material having sufficient structural integrity to support a flag pole disposed in either the first elongate portion 104 or the second elongate portion 106. The components of the dual position flag pole bracket 100 may be constructed from at least one of a ceramic, a metal, a plastic, and a wood. The components of the dual position flag pole bracket 100 may be formed from similar or different materials. In one embodiment, the dual position flag pole bracket 100 may be integrally formed from a single material. For example, the dual position flag pole bracket 100 may be constructed from a molded plastic, such as molded nylon.

Those of ordinary skill in the art will recognize or be able to ascertain many equivalents to the exemplary embodiments described herein by using no more than routine experimentation. Such equivalents are intended to be encompassed by the scope of the present disclosure and the appended claims.

For example, in embodiments, the dual position flag pole brackets described herein may include three or more elongate portions oriented at a variety of angles with respect to the base, such that the three or more elongate portions intersect at a region of intersection spaced apart from the base.

Also for example, in embodiments, the dual position flag pole brackets described herein may include bases with none, one, or more than one receiving aperture for receiving the elongate portions.

Accordingly, the appended claims are not to be limited to the embodiments described herein, can include practices other than those described, and are to be interpreted as broadly as allowed under prevailing law.

What is claimed is:

1. A dual position flag pole bracket including:

a base including first and second receiving apertures, a first elongate portion for receiving a flag pole, the first elongate portion disposed adjacent the base at a first location, and a second elongate portion for receiving a flag pole, the second elongate portion disposed adjacent the base at a different second location, the second elongate portion intersecting the first elongate portion at a region of intersection spaced apart from the base, wherein the first and second locations coincide with the first and second receiving apertures, respectively.

2. The flag pole bracket of claim 1, wherein the flag pole bracket is integrally formed.

3. The flag pole bracket of claim 1, wherein the base includes a substantially planar surface for attaching the base to a mounting surface.

4. The flag pole bracket of claim 1, wherein the base includes at least one mounting aperture for receiving at least one mated fastener for attaching the base to a mounting surface.

5. The flag pole bracket of claim 1, wherein the first and second elongate portions are removeably and replaceably attachable to the base.

6. The flag pole bracket of claim 5, wherein the first and second elongate portions are removeably and replaceably insertable into the first and second receiving apertures, respectively.

7. The flag pole bracket of claim 1, wherein the first and second elongate portions include first and second longitudinal axes oriented at different first and second angles with respect to the base.

8. The flag pole bracket of claim 1, wherein the first and second elongate portions include first and second longitudinal, axes, one of the axes being oriented substantially perpendicular to the base, the other of the axes being oriented at an acute angle with respect to the base.

9. The flag pole bracket of claim 8, wherein the acute angle spans substantially 45 degrees.

10. The flag pole bracket of claim 1, wherein the first and second elongate portions include substantially oval transverse cross-sections.

11. The flag pole bracket of claim 1, wherein one of the first and second elongate portions includes a substantially circular transverse cross-section, and the other of the first and second elongate portions includes a substantially elliptical transverse cross-section.

12. The flag pole bracket of claim 1, wherein the first and second elongate portions are attached to each other.

13. The flag pole bracket of claim 1, wherein the flag pole bracket is constructed from at least one of ceramic, metal, nylon, plastic, and wood.

14. The flag pole bracket of claim 1, further including:

at least one tightening aperture for receiving at least one mated fastener for inhibiting movement of a flag pole disposed in either of the first and second elongate portions, the at least one tightening aperture disposed adjacent the region of intersection.

15. The flag pole bracket of claim 14, further including:

at least one sidewall surrounding the at least one tightening aperture, the sidewall extending laterally outward from the region of intersection.

16. The flag pole bracket of claim 14, wherein the tightening aperture includes threads.

17. A dual position flag pole bracket comprising:

a base including at least one mounting aperture for receiving at least one mated fastener for attaching the base to a mounting surface, and first and second receiving apertures, a first elongate portion for receiving a flag pole, the first elongate portion disposed adjacent the first receiving aperture, the first elongate portion including a longitudinal axis disposed at a first angle with respect to the base, a second elongate portion for receiving a flag pole, the second elongate portion disposed adjacent the second receiving aperture, the second elongate portion including a second longitudinal axis oriented at a different second angle with respect to the base, the second elongate portion intersecting the first elongate portion at a region of intersection spaced apart from the base, and at least one tightening aperture for receiving at least one mated fastener for inhibiting movement of a flag pole disposed in either of the first and second elongate portions, the at least one tightening aperture disposed adjacent the region of intersection.

18. A dual position flag pole bracket including:

a base, a first elongate portion for receiving a flag pole, the first elongate portion disposed adjacent the base at a first location, the first elongate portion including a first longitudinal, axis being oriented substantially perpendicular to the base, and a second elongate portion for receiving a flag pole, the second elongate portion disposed adjacent the base at a different second location, the second elongate portion including a second longitudinal axis oriented at an acute angle with respect to the base, the second elongate portion intersecting the first elongate portion at a region of intersection spaced apart from the base.

19. The flag pole bracket of claim 18, wherein the flag pole bracket is integrally formed from nylon.

20. The flag pole bracket of claim 18, wherein the first and second elongate portions are attached to each other.

21. The flag pole bracket of claim 18, wherein die base includes a substantially planar surface for attaching the base to a mounting surface.

22. The flag pole bracket of claim 18, wherein the base includes at least one mounting aperture for receiving at least one mated fastener for attaching the base to a mounting surface.

23. The flag pole bracket of claim 18, wherein the first and second elongate portions are removeably and replaceably attachable to the base.

24. The flag pole bracket of claim 18, wherein the base includes first and second receiving apertures disposed at the first and second locations, and the first and second elongate portions are removeably and replaceably insertable into the first and second apertures, respectively.

25. The flag pole bracket of claim 18, wherein the acute angle spans substantially 45 degrees.

26. The flag pole bracket of claim 18, wherein the first and second elongate portions include substantially oval transverse cross-sections.

27. The flag pole bracket of claim 18, wherein the first elongate portion includes a substantially circular transverse cross-section, and the second elongate portion includes a substantially elliptical transverse cross-section.

28. The flag pole bracket of claim 18, further including:

at least one tightening aperture for receiving at least one mated fastener for inhibiting movement of a flag pole disposed in either of the first and second elongate portions, the at least one tightening aperture disposed adjacent the region of intersection.

29. The flag pole bracket of claim 28, wherein the tightening aperture includes threads.

30. The flag pole bracket of claim 28, further including:

at least one sidewall surrounding the at least one tightening aperture, the sidewall extending laterally outward from the region of intersection.

* * * * *